United States Patent [19]
Ota

[11] 3,756,693
[45] Sept. 4, 1973

[54] ELECTROPHORETIC DISPLAY DEVICE

[75] Inventor: Isao Ota, Osaka, Japan

[73] Assignee: Matsushita Electric Industrial Co. Ltd., Osaka, Japan

[22] Filed: Dec. 20, 1971

[21] Appl. No.: 209,729

[30] Foreign Application Priority Data
Dec. 21, 1970 Japan.............. 45/116183

[52] U.S. Cl............. 350/160 R, 40/52 R, 204/299, 313/108 A, 313/109.5
[51] Int. Cl. .......................... G02f 1/40, B01k 5/00
[58] Field of Search..................... 350/160 R; 40/52; 313/108 A, 109.5; 204/299

[56] References Cited
UNITED STATES PATENTS

| | | | |
|---|---|---|---|
| 3,612,758 | 10/1971 | Evans et al...................... | 350/160 R |
| 3,505,804 | 4/1970 | Hofstein......................... | 350/160 R |
| 3,229,281 | 1/1966 | Hackenfort............................ | 40/52 |
| 3,576,364 | 4/1971 | Zanoni................................... | 40/52 |

Primary Examiner—Ronald L. Wibert
Assistant Examiner—V. P. McGraw
Attorney—E. F. Wenderoth, V. M. Creedon et al.

[57] ABSTRACT

An electrophoretic display device in which an electrophoretic suspension layer including a dispersion of at least one electrophoretic material in a finely divided powder form suspended in a suspending medium is interposed between a pair of electrodes, at least one of which is transparent. A colored layer of a desired pattern is provided at the transparent electrode. An electric field is imposed between the pair of electrodes so as to change the optical property such as reflective color or luminescent color of the suspension layer by changing the spatial distribution of the electrophoretic material in the suspending medium electrophoretically.

15 Claims, 12 Drawing Figures

3,756,693
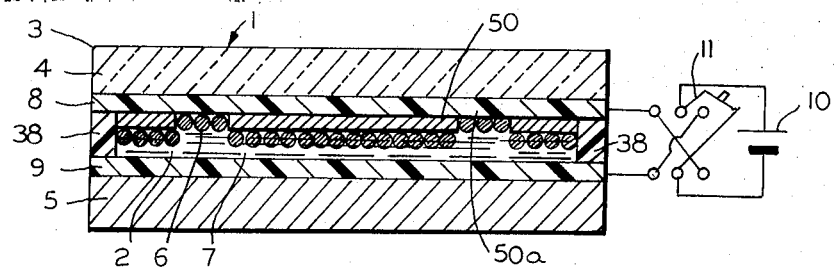
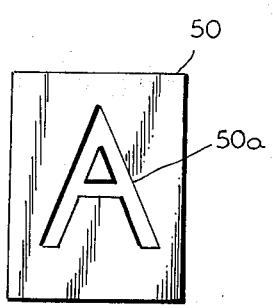
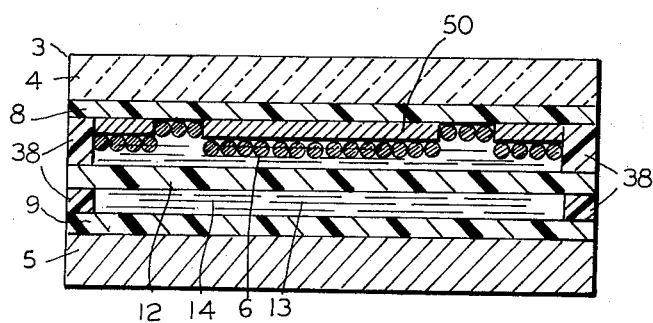
FIG.1b   FIG.2
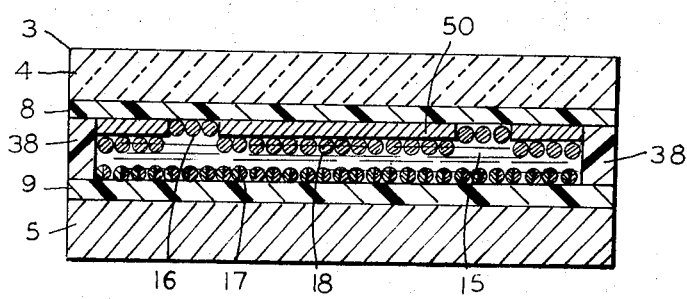
FIG.3
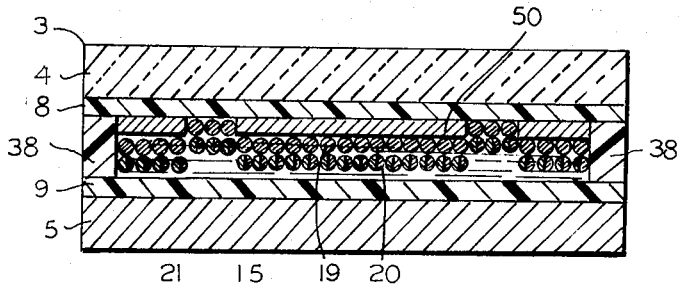
FIG.4
INVENTOR
ISAO OTA

INVENTOR
ISAO OTA

ELECTROPHORETIC DISPLAY DEVICE

BACKGROUND OF THE INVENTION

This invention relates to a display device and particularly to an electrophoretic display device comprising at least one electrophoretic material suspended in a suspending medium.

Such electrophoretic display devices are described in the applicant's copending U. S. Pat. application Ser. No. 26,874, now U.S. Pat. No. 3,668,106, or Ser. No. 44,023. In these patent applications an electrophoretic suspension layer including at least one electrophoretic material suspended in a liquid suspending medium is interposed between a pair of electrodes, at least one of which is transparent. An electric field is imposed between the pair of electrodes so as to change the reflective color (in the case of patent application Ser. No. 26,874), now U.S. Pat. No. 3,668,106, or the luminescent color (in the case of patent application Ser. No. 44,023) of the electrophoretic suspension layer by changing electrophoretically the spatial distribution of the electrophoretic material. However, the devices according to these prior patent applications have some disadvantages. For example, the contour of the image displayed on those devices is sometimes not clear. The color of the image background is restricted to the color which the electrophoretic suspension layer used can show. Segmental electrodes for displaying, for example, numerical characters, must be in the same shape as that of the numerical character to be displayed and are difficult to prepare.

SUMMARY OF THE INVENTION

An object of this invention is to provide an electrophoretic display device capable of displaying a clear image.

A further object of this invention is to provide a display device capable of displaying a colorful image.

A still further object of this invention is to provide a display device which is easy to prepare.

These objects are achieved by a display device according to the present invention which comprises an electrophoretic suspension layer including a dispersion of at least one electrophoretic material in a finely divided powder form suspended in a suspending medium, said suspension layer having two opposite major surfaces; a first electrode and a second electrode which are opposed to each other and are positioned on said two opposite major surfaces of said suspension. Means are coupled to said electrodes to apply a field across said suspension layer through said electrodes, at least one of said electrodes being transparent; and a colored layer in a given pattern provided at the transparent electrode. An electric field is applied across the two electrodes so as to change the optical reflective or luminescent color of the suspension layer.

Other objects and advantages of this invention will be apparent from the following description, the accompanying drawings and the appended claims.

BRIEF DESCRIPTION OF THE DRAWING

In the drawing:

FIG. 1a is a cross-sectional view of a display panel in accordance with the present invention;

FIG. 1b is a front view of a colored layer of a desired pattern for use in the device of FIG. 1a.

FIGS. 2–6 are cross sectional views of another embodiment of this invention;

FIG. 7b is a front view of a first electrode for use in a numerical character display panel of FIG. 7a;

FIG. 7c is a front view of a colored layer of a desired pattern for use in a numerical character display panel of FIG. 7a;

FIG. 8 is a front view of a first electrode for use in a numerical character display panel of FIG. 7a; and FIG. 9 is a front view of an image display panel according to this invention. The size and shapes of elements of the drawings should not be considered as actual sizes or even proportional to actual sizes because many elements have been purposely distorted in size or shape in order to more fully and clearly describe the invention.

DETAILED DESCRIPTION OF THE INVENTION

Figure 5:
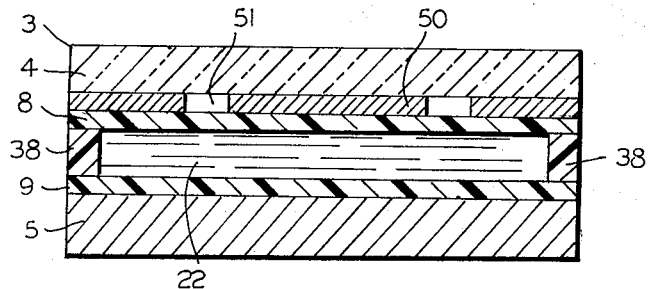

Referring to FIG. 1a, reference character 1 designates, as a whole, a display panel which has an electrophoretic suspension layer 2 enclosed in a housing 3. The housing 3 has a frame 38 and two opposed major housing walls 4 and 5, at least one of which, for example, housing wall 4, is transparent. The housing walls 4 and 5 have a first electrode 8 and a second electrode 9 attached thereon, respectively. At least one of the electrodes 8 and 9 is transparent, in this case, the first electrode 8 is transparent. The display device in the present invention is characterized in that a colored layer 50 having therein an aperture 50a of a desired pattern is provided at the transparent electrode 8. A front view of one example of the colored layer 50 is shown in FIG. 1b. Said suspension layer 2 has two opposite major surfaces along said two opposite major housing walls 4 and 5 and includes a dispersion of at least one electrophoretic material 6 in a finely divided powder form suspended in a colored suspending medium 7. The particles of the material 6 are shown greatly enlarged in this and subsequent figures for clarity of illustration. Said first electrode 8 and second electrode 9 are connected to output terminals of a D. C. voltage applying means 10 through a polarity-reversing-switching-device 11. When the electrophoretic material 6 is, for example, positively charged in said colored suspending medium 7, the D. C. voltage applied across the electrodes 8 and 9, a cathode and an anode, respectively moves the positively charged electrophoretic material 6 toward the cathode 8 electrophoretically and the electrophoretic material 6 is deposited on the surfaces of the electrode 8 and the colored layer 50 as shown in FIG. 1a. If the electrophoretic material 6 is white and the colored layer 50 and the colored suspending medium 7 are black, the display panel 1 as shown in FIG. 1a shows a clear white character A against a black background because the white material 6 deposited in the aperture 50a shows clearly through the electrode 8 while the white material deposited on the surface of the colored layer 50 is hidden by the black colored layer 50. The white character A displayed at the electrode 8 is erased and the whole surface of the electrode 8 can be made to appear uniformly black by reversing the polarities of the applied voltage because the white material 6 deposited on the electrode 9 is hidden by the black suspending medium 7.

When the colored layer 50 is white, the display panel 1 displays a black character A against the white background upon application of a D. C. voltage between the electrodes 8 and 9, an anode and a cathode, respectively. The black character A displayed at the electrode 8 is erased the whole surface of the electrode 8 can be made to appear uniformly white by reversing the polarities of the applied voltage. At any rate, any pattern can be displayed by providing a colored layer 50 of a desired pattern at the electrode 8 without using an electrode of a desired pattern.

When the electrophoretic material 6 is yellow and the suspending medium 7 is a solution of cyan color, the color of the suspension layer 2 in which the material 6 is uniformly suspended in the medium 7 has a green color which is a mixture of the yellow color of the material 6 and the cyan color of the medium 7. If the colored layer 50 is green, or deep green then the character A is displayed yellow or cyan against a green background at the electrode 8, depending upon the polarities of the applied voltage and the electrophoretic material 6. When the colored layer is yellow, then the character A is displayed in cyan against a yellow background by applying voltage of a proper polarity.

When the colored layer 50 has a color which the electrophoretic suspension layer 2 used can not display, the panel 1 can have a colorful pattern. At any rate, the contour of the displayed pattern depends upon the contour of the colored layer 50 with a desired pattern and can be sharp as long as the pattern of the aperture 50a in the colored layer 50 has a sharp contour. The colored layer 50 is usually opaque but can be translucent depending upon the purpose of the display. For example, when the colored layer 50 of the desired pattern is made up of a cyan filter layer and electrophoretic material 6 consists of yellow pigment particles and the suspending medium 7 consists of red suspension having red pigment particles suspended in a transparent liquid, the displayed character A has, for one polarity of the applied voltage, a yellow color against a green background consisting the cyan filter layer and yellow pigment particles deposited therebeneath or has, for the other polarity of the applied voltage, a red color against an almost black background. That is, the display panel having a translucent colored layer of a desired pattern can be effectively used so as to change the color of the image background in addition to changing the color of the image upon application of an electric field.

The colored layer 50 which is opaque or translucent can be prepared by well known coating techniques such as printing, vacuum evaporation, photoetching, painting and so on. In a special case, thin colored sheet material which has been cut in the form of the desired pattern may be adhered to the surface of the electrode 8. The colored layer 50 can be given any color, for example, by incorporation of dye or pigment particles therein. The colored layer 50 is not always composed of only one color but can be composed of at least two colors which are different from each other so as to display a colorful pattern. A display panel having a colored layer 50 composed of different colors and having a suspension layer made up of some units which differ in color from each other can display a very colorful image. The colored suspending medium 7 for use in the device shown in FIG. 1a can be prepared so as to have the desired color by dissolving a colored substance, such as a dye, in a colorless liquid or by suspending electrically neutral colored particles, such as dyes or pigments in a colorless liquid. The electrophoretic suspension layer 2 can be luminescent under exposure to radiation such as U. V. light or X-ray if at least one of the components such as the electrophoretic material, the suspending medium or a porous layer which is described later, of the suspension 2 is luminescent. The display device having a luminescent electrophoretic suspension layer can produce a luminescent display thereon when exposed to radiation. In such a luminescent device, a colored layer 50 of a desired pattern which is luminescent may also be used effectively.

In FIGS. 2–4, are shown different constructions of the electrophoretic suspension layer which are capable of having the reflective color and/or luminescent color changed by the application of the electric field thereto. In FIGS. 2–4, similar reference numbers designate components similar to those of FIG. 1a. Referring to FIG. 2, the electrophoretic suspension layer 14 is made up of the electrophoretic material 6 suspended in a transparent liquid suspending medium 13 having a colored porous layer 12 inserted therein.

In FIG. 2 and the following figures, descriptions of voltage source 10 and the switching device 11 are omitted.

When a D. C. electric field is applied across the two electrodes 8 and 9, the electrophoretic material 6 is caused to pass through the colored porous layer 12 and moves toward one of the electrodes, depending upon the polarities of the material 6 and the applied voltage. When the reflective color or luminescent color of the material 6 differs from those of the colored porous layer 12, the change in the spatial distribution of the material 6 in the suspending medium 13 by electrophoresis results in a change in the reflective color or in the luminescent color of the electrophoretic suspension layer 14. Colored porous layer 12 in the present invention can be made from any sheet material having pores therein. The size of the pores must be large enough to pass the particles of electrophoretic material therethrough and small enough to hide the electrophoretic material from sight. Operable materials are a cloth or a mesh woven of fibers; a fibroid sheet having thousands of irregular pores; a thin plate with a lot of tiny holes; and a sheet having granular material bound together with resin or an adhesive agent to form a large number of pores. When the colored porous layer 12 has a distribution of localized pores only in the form of a given pattern, the colored porous layer 12 also acts as a colored layer 50 and the colored layer 50 on the electrode 8 can be omitted.

Referring to FIG. 3, a suspending medium 15 includes at least two kinds of electrophoretic materials 16 and 17 in a finely divided powder form. The suspending medium 15 and the materials 16 and 17 together make up the electrophoretic suspension layer 18. Said two kinds of electrophoretic materials 16 and 17 are different from each other with respect to the charge polarity and reflective color and/or luminescent property such as luminescent color or luminescent strength. When a D. C. voltage is applied across the electrodes 8 and 9, said two kinds of electrophoretic materials 16 and 17 are caused to move electrophoretically in directions opposite to each other and characters A having different colors are, for example, alternately displayed at the electrode 8 by changing the polarities of applied voltage alternately.

Referring to FIG. 4, an electrophoretic suspension layer 21 includes a suspending medium 15 and at least two kinds of electrophoretic materials 19 and 20 in a finely divided powder form. Said two kinds of electrophoretic materials 19 and 20 have the same charge polarity but have different electrophoretic mobilities and optical reflective color and/or luminescent property from each other. When a D. C. voltage is applied across the suspension layer 21, said two kinds of electrophoretic materials 19 and 20 are caused to move electrophoretically at same direction but in the different speeds, so that character A having different colors is displayed on the electrode 8 by changing the polarities of the applied voltage.

As is apparent from the foregoing description and figures, the reflective color or luminescent color of the suspension layers as designated by reference numbers 2, 14, 18 or 21 according to this invention can be changed upon application of an electric field across the suspension layer. TThis is because the spatial distribution of electrophoretic material in the suspension is changed by application of an electric field and a layer of at least one electrophoretic material deposited on an electrode hides or is hidden by, the residual component in the suspension, such as the colored suspending medium, a colored porous layer or another electrophoretic material. In the devices of the foregoing and following figures, it is also possible that both of the aforesaid two opposite major housing walls and both of the aforesaid first electrode and second electrode be transparent, and in addition that colored layers 50 having the same or different patterns and being of the same or different colors can be provided at the surfaces of both the electrodes 8 and 9. Such a device can display a pattern on both sides.

Referring to FIG. 5, wherein similar reference numbers designate components similar to those of the foregoing figures, a suspension layer 22 can be any possible electrophoretic suspension layer, such as the suspension layer 2, 14, 18 or 21 of FIGS. 1a, 2, 3 or 4. The suspension layer 22 includes at least one electrophoretic material suspended in a suspending medium and is enclosed in a housing 3 having two opposite major housing walls 4 and 5, at least one of which is transparent. In the drawing, housing wall 4 is transparent. The display panel as shown in FIG. 5 is characterized in that the colored layer 50 of the desired pattern is interposed between the transparent housing wall 4 and the transparent electrode 8. The space 51 formed by the shaped aperture in colored layer 50 is preferably filled with a transparent material such as glass or resin so as to flatten the surface on which the transparent electrode 8 is provided. It is also possible for the transparent housing wall 4 to have a hollow therein with a depth equal to the thickness of the colored layer 50 in which hollow the colored layer 50 is accommodated and the transparent electrode 8 is provided on the flat surface consisting of the surfaces of the colored layer 50 and the housing wall 4. The device as shown in FIG. 5 has the advantage that the distortion of the electric field across the suspension layer usually caused by the presence of the colored layer 50 does not occur and the gap between the electrodes can be small even if the colored layer 50 is thick. In a special case, transparent electrode 8 is provided only on the area of the housing wall 4 corresponding to the aperture in the colored layer 50.

Figure 6:
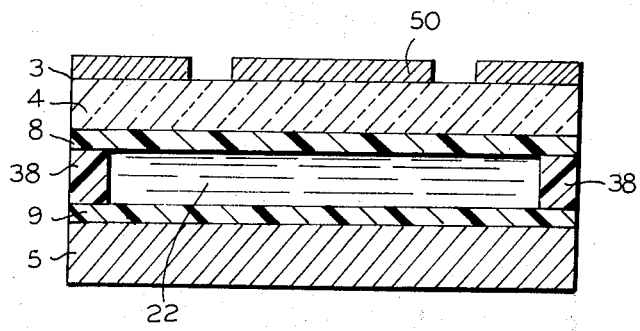

Referring to FIG. 6, wherein similar reference numbers designate components similar to those of the foregoing figures, an electrophoretic suspension layer 22 can be any possible electrophoretic suspension layer, such as one of the suspension layers 2, 14, 18 or 21 of FIG. 1a, 2, 3 or 4. The suspension layer 22 includes at least one electrophoretic material suspended in a suspending medium and is enclosed in a housing 3 having two opposite major housing walls 4 and 5. The display device as shown in FIG. 6 is characterized in that the colored layer 50 is provided on the outer surface of the transparent housing wall 4. The device in FIG. 6 is easy to construct but is a little difficult to see due to parallax.

It is desirable in the device of FIG. 6 that the transparent housing wall 4 as thin as possible or the device will have a large size.

Figure 7A:
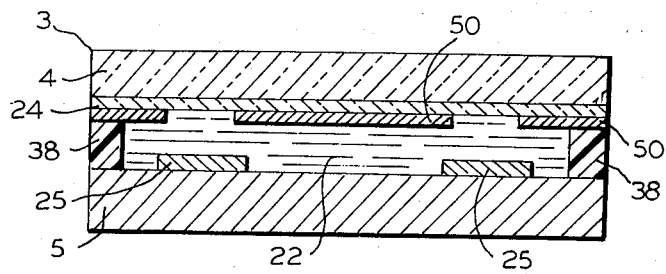
FIG. 7a is a cross sectional view of a numerical character display panel according to this invention.
Figure 7B:
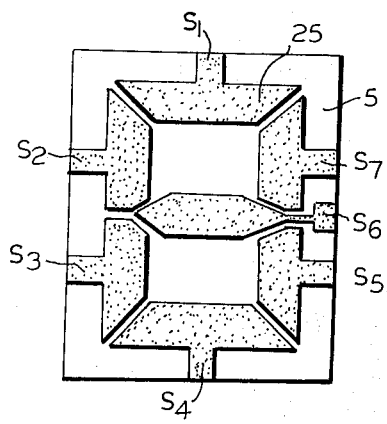
Figure 7C:
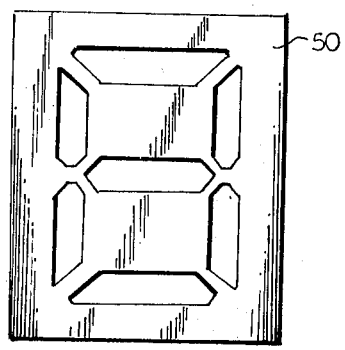

Referring to FIG. 7a, wherein similar reference numbers designate components similar to those of the foregoing figures, an electrophoretic suspension layer 22 can be any possible electrophoretic suspension layer, such as one of the suspension layers 2, 14, 18 or 21 of FIG. 1a, 2, 3 or 4. The suspension layer 22 includes at least one electrophoretic material suspended in a suspending medium and is enclosed in a housing 3 having two opposite major housing walls 4 and 5. Housing wall 4 is transparent. FIGS. 7b and 7c are front views of the electrode 25 and the colored layer 50, respectively. A first electrode 25 is composed of a plurality of electrode segments $S_1$–$S_7$ which are separated from each other as shown in FIG. 7a and FIG. 7b. A second electrode 24 extends uniformly across the whole of the transparent housing wall 4. At least one of the electrodes 25 and 24 is transparent. In FIG. 7a the electrode 24 is transparent. Different combinations of said plurality of electrode segments $S_1$–$S_7$ will display desired numerical character when a D. C. electric field is applied across the selected electrode segments of said first electrode 25 and the second electrode 24. For example, a D. C. electric field applied across the second electrode 24 and the electrode segments $S_1$, $S_4$, $S_5$, $S_6$, and $S_7$ of the first electrode 25 will cause the device to display the numerical character 3. If the colored layer 50 is not provided at the side corresponding to the transparent electrode 8, the character which is displayed is poor in shape because the shape of the electrode segments decides the shape of the numerical character which is displayed. Besides, the surrounding region of, for example, one of the electrode segments usually does not display quite the same color as that in the central region thereof, that is, the pattern displayed is vague in the surrounding region because the electric field across the electrophoretic suspension layer differs in strength between the surrounding region and the central region.

When the transparent electrode 24 has therein the colored layer 50 as shown in FIG. 7c, the shape of the character which is displayed corresponds to the shape of the apertures in the colored layer 50 which are opposite the energized segments of electrode 25 and has a good shape so that the shape of each of the electrode segments is not important as long as each of the electrode segments extends over the whole of the corresponding transparent region of the electrode 24 exposed through the corresponding apertures in layer 50. Therefore, the segments of electrode 25 are easy to prepare. This is another large advantage of the device according to the present invention. The electrode segments as shown in FIG. 8 can thus be properly utilized in the numerical character display device as shown in FIG. 7a.

Figures 8, 9:
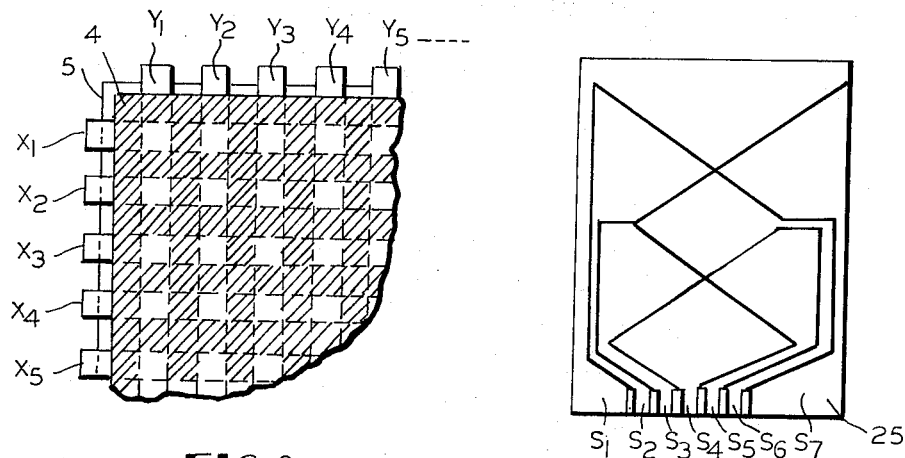

Referring to FIG. 9, wherein similar reference numbers designate components similar to those of the foregoing figures, a suspension layer 22 can be any possible electrophoretic suspension layer, such as the suspension layer 2, 4, 18 or 21 of FIG. 1a, 2, 3, or 4.

A first transparent electrode consists of a plurality of strip electrode $X_1, X_2, X_3, \ldots$ which are parallel to each other and which are attached to the inner surface of said transparent housing wall 4.

A second electrode is attached to the inner surface of said housing wall 5 and consists of a plurality of strip electrodes $Y_1, Y_2, Y_3 \ldots$ which are parallel to each other and are orthogonal to said strip electrodes $X_1, X_2, X_3 \ldots$. The portion of the suspension layer 22 at the intersection of the two strip electrodes, for example, $X_2$ and $Y_3$ forms one picture element. The whole area of the transparent electrode other than the picture elements is coated with any colored layer to form a checked pattern constituting the colored layer 50. A selection of more than one strip electrode from among the strip electrodes forming the first and second electrodes produces a desired pattern with high sharpness consisting of a plurality of picture elements.

Electrophoretic material deposited on an electrode surface by electrophoresis will stay on the electrode from a few seconds to more than one month, depending upon the suspension even after removal of an applied electric field. This means that the display device according to the present invention can memorize output information without using further electric power. Electrical resistance of the colored layer 50 is important when the colored layer 50 is interposed between the transparent electrode and the suspension layer as shown, for example, in FIG. 1a. In such a device, if the color in the background of the pattern to be displayed (that is, the color on the colored layer) on the display panel having the colored layer 50 which is translucent is required to be changed, the resistance of the colored layer 50 must be low compared to that of the suspension layer so that the electric field applied between the electrodes is imposed mainly across the suspension layer. The colored layer 50 for use in the devices as shown in FIG. 5 or FIG. 6 may be electrically insulating.

The aforesaid electrophoretic suspension layer can be prepared by suspending pigment particles such as titanium dioxide, zinc oxide, hansa yellow or chrome yellow in the colored suspending medium the color of which differs from that of the pigment particles, by suspending pigment particles in a liquid suspending medium having a colored porous layer therein the color of which differs from that of the pigment particles or by suspending at least two kinds of pigment particles which differ in color and in charge polarity or electrophoretic mobility from each other in a liquid suspending medium. Average particle sizes of the finely divided particles which will be operable range from $0.1\mu$ to $50\mu$. The liquid suspending medium which will be operable is hexane, heptane, kerosene, liquid paraffin, butanol, benzene, toluene, xylene, trichlorotrifluoro ethane, tetrachlorodifluoroethane, olive oil, silicon oil and so on.

It is preferred to add any suitable and available charge control agent, dispersion agent or stabilizing agent such as surface active agent, metallic soap, resin or oil to the electrophoretic suspension layer to provide a stable suspension for display purpose.

A housing wall for use in the device according to the present invention can be glass, plastic or metal plate. A plastic sheet having a major center cut out can be used for a frame 38 of the housing 3. A transparent electrode can be, for example, tin oxide ($SnO_2$) or indium oxide ($In_2O_3$) and is coated on the transparent housing wall such as glass plate by, for example, vacuum evaporation. A colored layer of a desired pattern can be provided, for example, on the transparent electrode by, for example, screen printing. A housing 3 as shown in FIG. 1a can be prepared by adhering a transparent housing wall having a transparent first electrode and a colored layer having a desired pattern provided thereon to a frame adhered on a second electrode provided on another housing wall. The housing 3 has an inlet and an outlet formed, for example, in the frame 38. An electrophoretic suspension layer such as the suspension layer 2, 18 or 21 of FIGS. 1a, 3 or 4 is poured into the housing through the inlet, for example, by an injector. The inlet and the outlet are closed after the housing is filled with the electrophoretic suspension layer. In the case of the suspension layer 14 of FIG. 2, the housing previously has a colored porous layer positioned therein and an electrophoretic suspension layer is poured into the housing in a similar manner as described above. The electrode segments 25 as described in FIGS. 7b or 8 can be prepared, for example, by the wellknown photoetching technique.

One can use any appropriate apparatus for applying an electric field across the suspension layer through the two electrodes. For example, a pulse generator, a battery or any other D. C. source can be used. In order to display a pattern cyclically or to erase the displayed image, an A. C. source of appropriate frequency can also be used.

I claim:

1. An electrophoretic display device comprising an electrophoretic suspension layer having a suspending medium and at least one electrophoretic material in a finely divided powder form suspended in said suspending medium, said suspension layer having two opposite major surfaces; a first electrode and a second electrode which are spaced from and opposed to each other and are positioned on said two opposite major surfaces of said suspension layer, respectively; at least one of said first electrode and said second electrode being transparent; a colored layer having at least one aperture in a desired pattern and positioned at the transparent electrode; and means coupled to said electrodes for applying an electric field across said suspension layer through said electrodes, said electric field changing the optical property of said suspension layer so as to produce a display of said desired pattern.

2. A device as claimed in claim 1 wherein at least one of said electrodes is in the shape of the desired pattern.

3. A device as claimed in claim 1 wherein at least one of said electrodes has a plurality of segments.

4. A device as claimed in claim 1 wherein said first electrode consists of a plurality of strips of electrode material which are parallel to each other, and said second electrode consists of a plurality of strips of electrode material which are parallel to each other and are orthogonal to said first electrode strips.

5. A device as claimed in claim 1 wherein said colored layer has at least two color-different from each other.

6. A device as claimed in claim 1 wherein said colored layer is luminescent.

7. A device as claimed in claim 1 wherein said colored layer is against said transparent electrode and is between said electrode and said suspension layer.

8. A device as claimed in claim 1 further including a housing enclosing said suspension layer.

9. A device as claimed in claim 8 wherein said housing has a transparent housing wall covering said transparent electrode.

10. A device as claimed in claim 9 wherein said colored layer is between said transparent electrode and said transparent housing wall.

11. A device as claimed in claim 9 wherein said colored layer is on the outside surface of said transparent housing wall.

12. A device as claimed in claim 1 wherein the reflective color of said electrophoretic suspension layer is changeable by application of said electric field.

13. A device as claimed in claim 5 wherein said suspension layer is divided into a plurality of suspension units which differ in color from each other.

14. A device as claimed in claim 1 wherein said first electrode and second electrode are both transparent and further comprising an additional colored layer, there being a colored layer at both of said electrodes.

15. A device as claimed in claim 1 wherein one of the components of said suspension layer is luminescent, the luminescent color of said suspension layer being changeable by application of said electric field.

* * * * *